Oct. 4, 1960 M. KUTS 2,954,815
METHOD AND APPARATUS FOR ASSEMBLING RUBBER THREADS INTO RIBBONS
Filed July 15, 1957 6 Sheets-Sheet 1
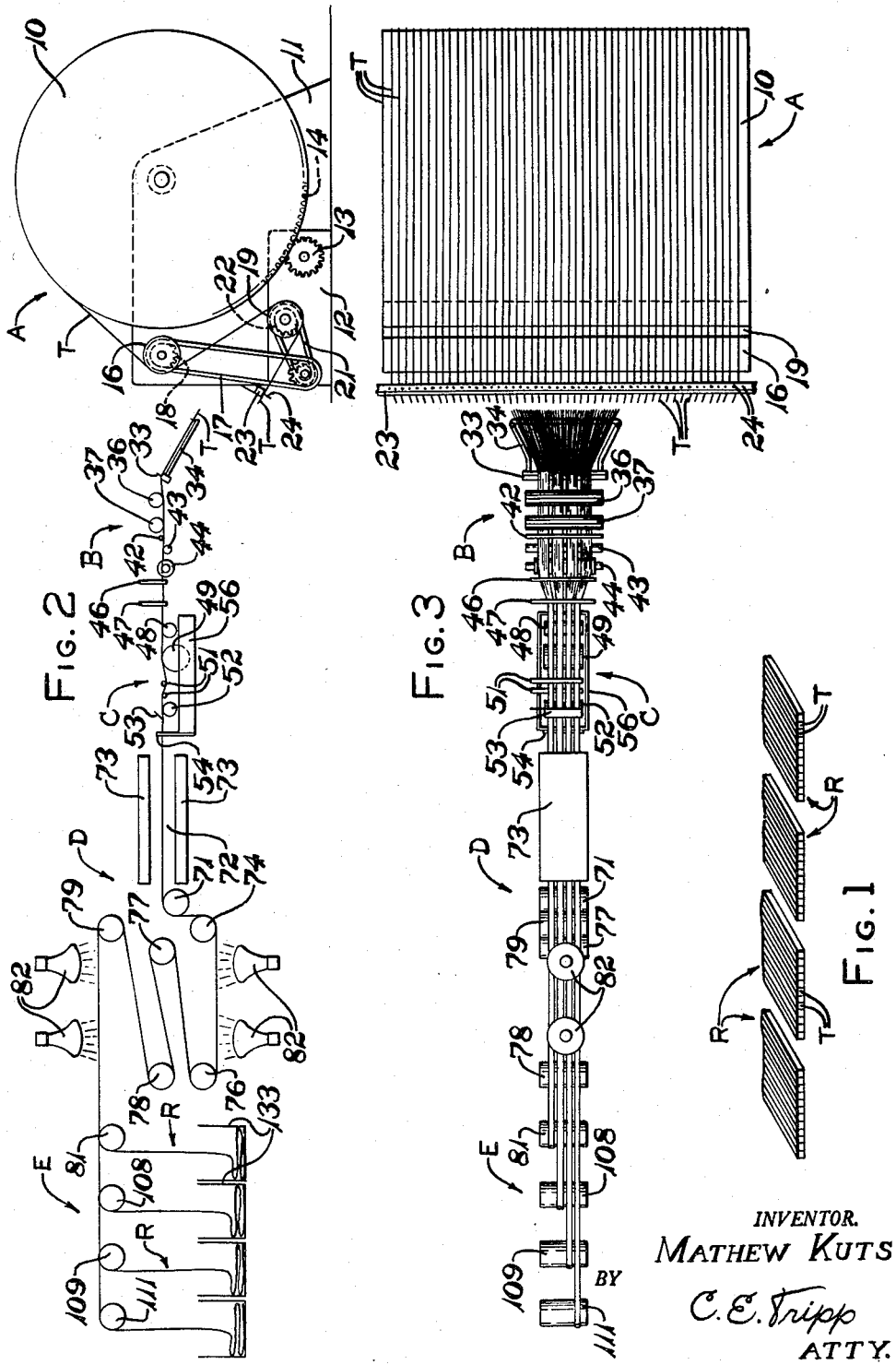
INVENTOR.
MATHEW KUTS
BY C. E. Tripp
ATTY.

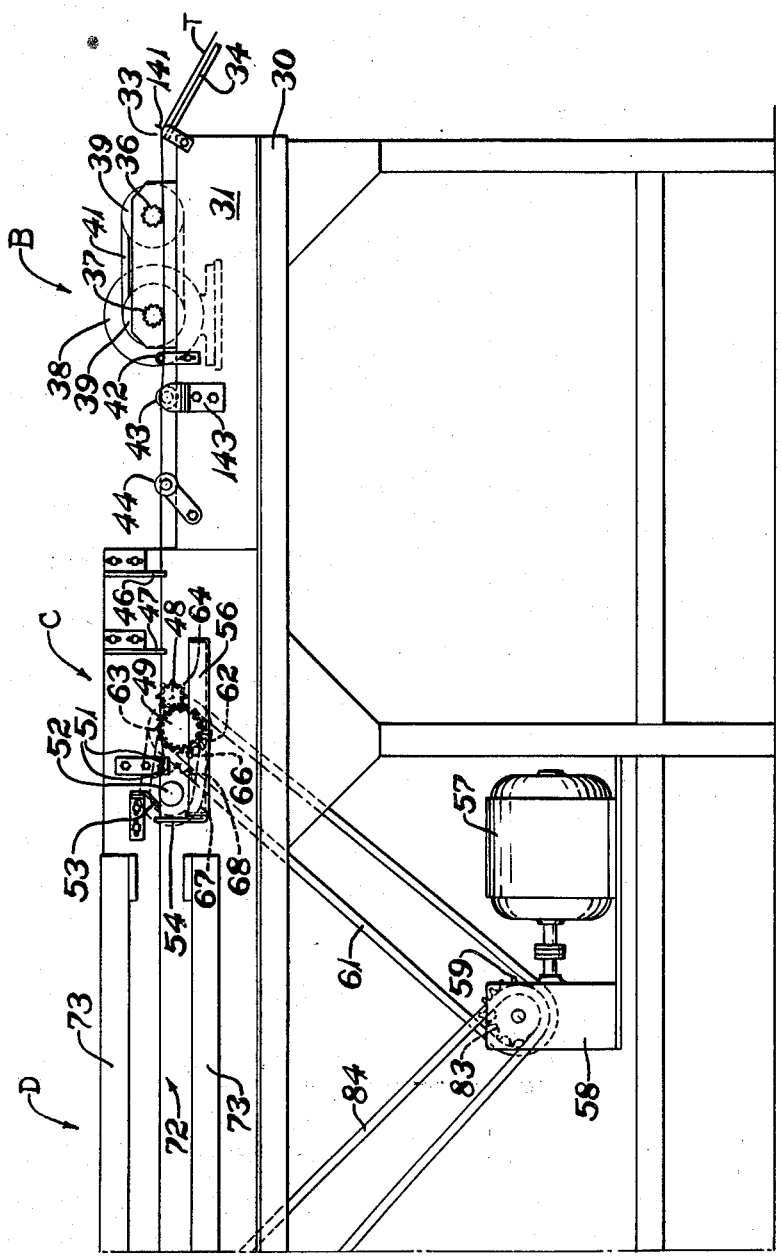

Oct. 4, 1960 M. KUTS 2,954,815
METHOD AND APPARATUS FOR ASSEMBLING RUBBER THREADS INTO RIBBONS
Filed July 15, 1957 6 Sheets-Sheet 3

INVENTOR.
MATHEW KUTS
BY C.E. Tripp
ATTY.

Oct. 4, 1960   M. KUTS   2,954,815
METHOD AND APPARATUS FOR ASSEMBLING RUBBER THREADS INTO RIBBONS
Filed July 15, 1957   6 Sheets-Sheet 4
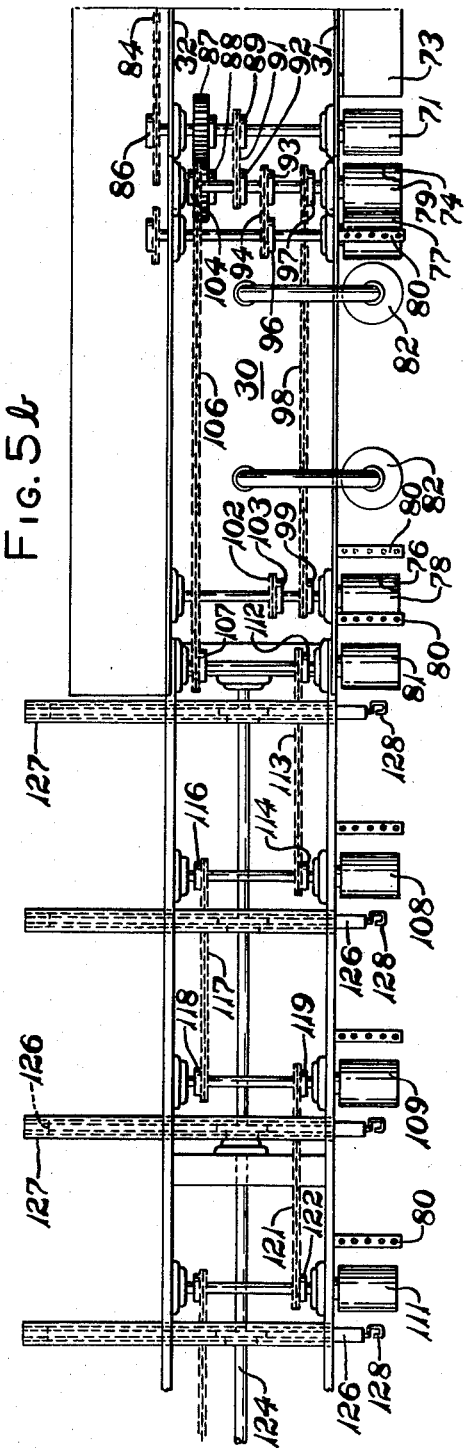
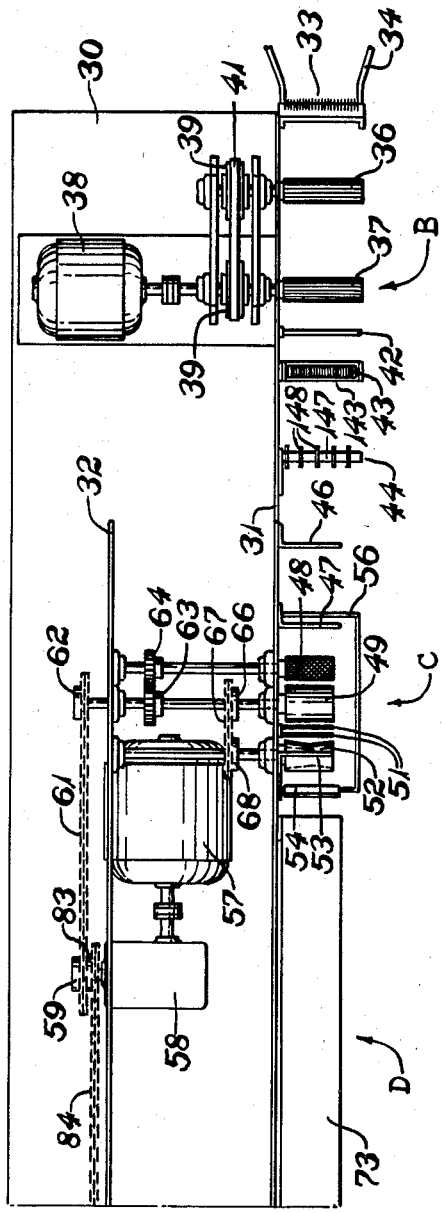
INVENTOR.
MATHEW KUTS
BY
C. E. Tripp
ATTY.

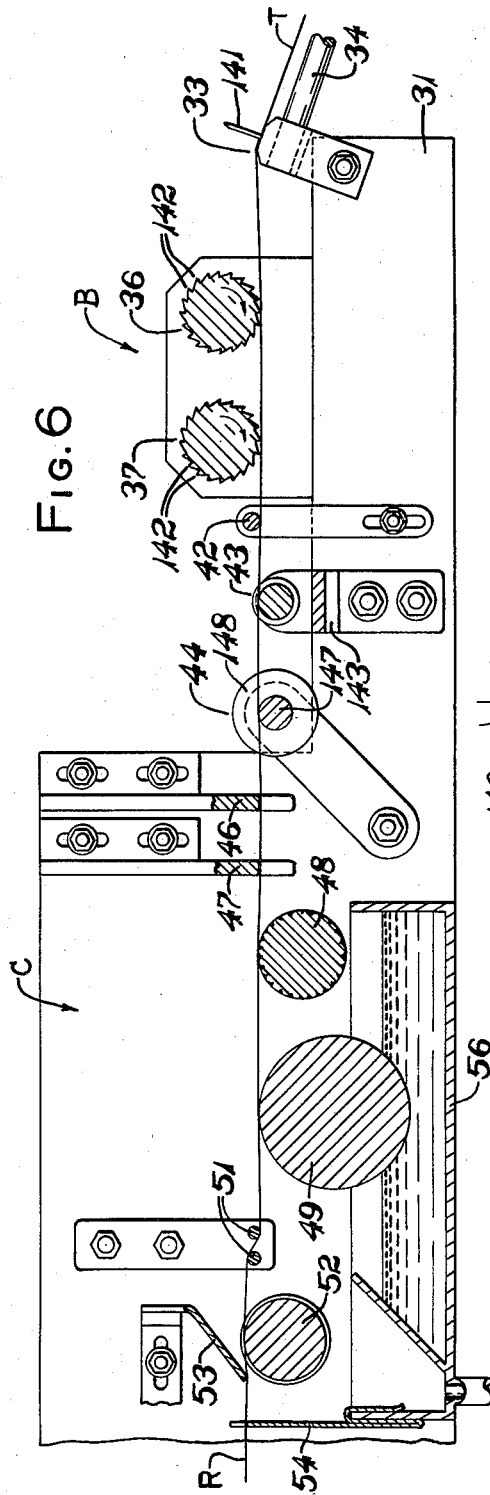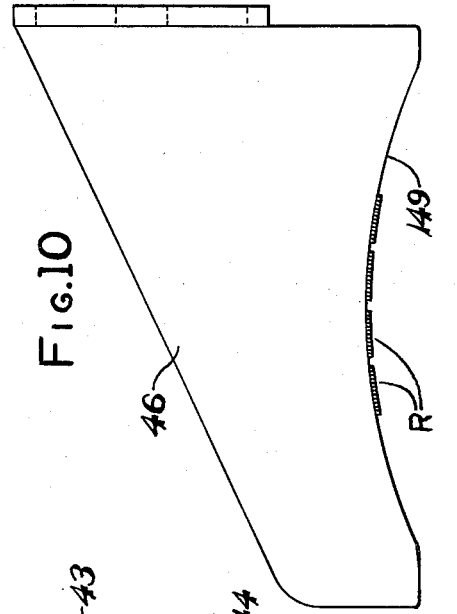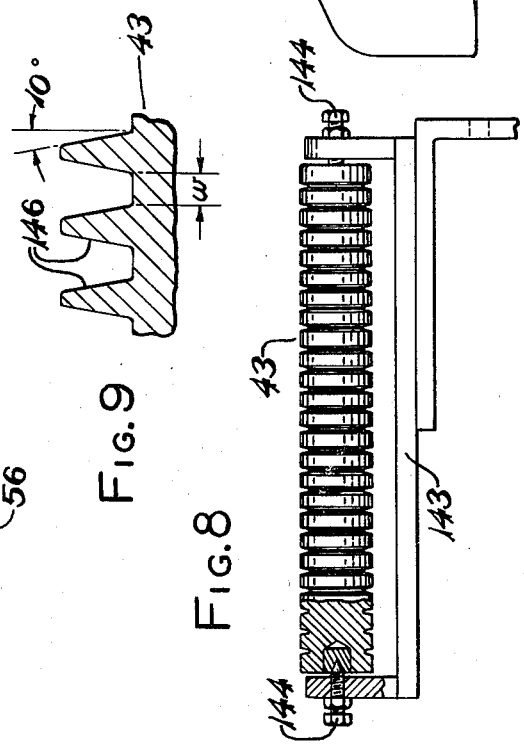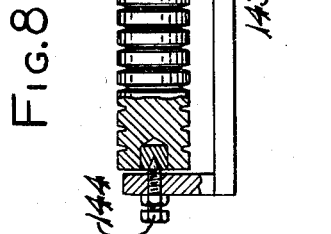

Oct. 4, 1960 M. KUTS 2,954,815
METHOD AND APPARATUS FOR ASSEMBLING RUBBER THREADS INTO RIBBONS
Filed July 15, 1957 6 Sheets-Sheet 6
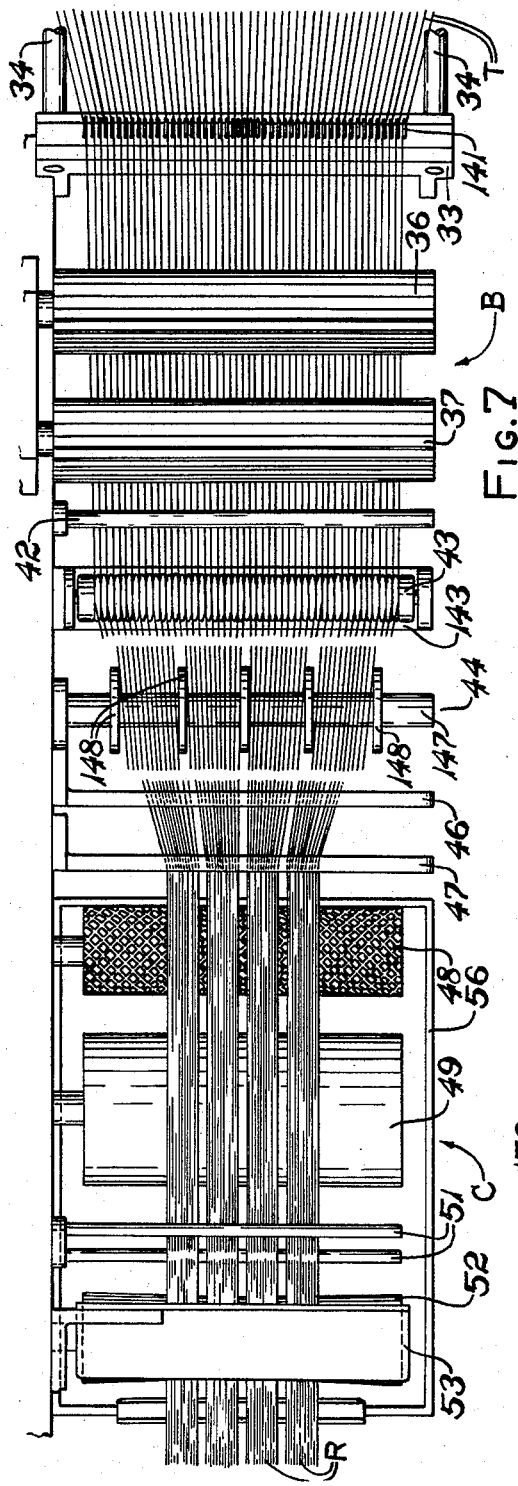
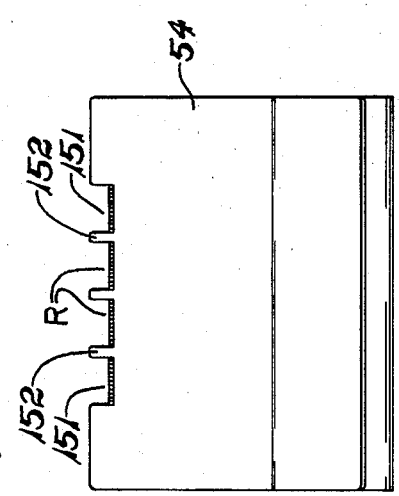
INVENTOR.
MATHEW KUTS
BY
C.E. Tripp
ATTY.

United States Patent Office 2,954,815
Patented Oct. 4, 1960

2,954,815

METHOD AND APPARATUS FOR ASSEMBLING RUBBER THREADS INTO RIBBONS

Mathew Kuts, Akron, Ohio, assignor to The B. F. Goodrich Company, New York, N.Y., a corporation of New York Filed July 15, 1957, Ser. No. 671,811

8 Claims. (Cl. 154—1.7)

This invention relates to a method and apparatus for providing ribbons of separable lengths of rubber threads. Such threads are widely employed, for example, by the textile industry as components of elastic textile products such as yarn and webbing. The rubbery threads are usually obtained from a maker of rubber goods, and to facilitate packaging and shipping by the thread maker and setting up the apparatus at the textile processing plant it has been proposed to assemble the threads into ribbon form, materially reducing handling cost. It is a feature of my invention that I can assemble fine rubber threads into a ribbon or ribbons wherein the bond between the threads has adequate physical strength and uniformity for subsequent packaging or placement on spools or the like, yet the individual threads are readily separated from the tape or ribbon in order that such individual threads may be wrapped with thread or otherwise incorporated in a finished article.

The threads may be formed initially by slitting thin rubber strips usually formed of coagulated rubber latex, and the individual threads thus formed are vulcanized. In the process of my invention the cured threads are united into ribbons by cementing them edge to edge.

The latex sheets are thin and the rubber threads slit from the sheets are preferably square in section and are quite fine, a typical range of sizes being 30 to 150 thread ends per inch of ribbon, that is the threads may be as fine as .007″ to .033″ in thickness. Threads this fine are exceedingly sensitive to tension and to erratic variations in tension, as they pass through the ribbon making apparatus. Also, they are weak and must be handled daintily. To complicate matters, it has been found that the threads must be united into the form of ribbons with their adjacent edge surfaces uniformly in contact along their length without gap or overlap, in order that the joints of the threads be dependably uniform, so that the ribbon does not spontaneously separate under normal careful handling.

The threads, being very light and delicate, present severe manipulation problems during their assembly into ribbons. The balance of tensions along the threads throughout the entire operation is delicate and the local tension must be precisely controlled at every part of the process. Also, it is difficult to uniformly abut and join cured threads side to side all along the ribbon without gaps or overlaps. Other problems such as feeding the threads into the ribbon making apparatus proper without breakage, making possible the assembly of several individual ribbons at one time (the specific form of the invention to be described can be set to make about 50 threads into 1 to 8 ribbons), manipulation of the cement, drying of the cement without excessive sag and loss of control, are presented and the successful production of consistently perfect ribbons depends upon solving all of these problems by means that can be coordinated in a single apparatus that can be set to operate on a given starting material.

A preferred method and apparatus by which my invention solves these problems will first be described generally and briefly.

The machine can be arbitrarily divided into five main sections, a drum let-off section, a thread gathering section, a thread cementing section, a ribbon drying section, and a ribbon packaging section. In the form of the invention to be described, after the threads have been slit from the unvulcanized latex, they are dusted with dusting powder and wound up on large metal drums several feet in diameter, there being a number of rows of coils of individual threads (about 50 in the detailed example to be given later) wound on each drum. The drums are then placed in a vulcanizing chamber in which the individual coils of threads are cured. The drums are large in diameter (about 4 feet) so that the change in radius as the threads unwind is a negligible percentage of the radius, and the drum at the machine can be driven at constant speed.

When a drum of vulcanized threads is mounted at the ribbon making machine, the threads are threaded over the various rolls and combs making up the machine, the machine being open-sided to facilitate this operation. The first thing that must be done then is to free the threads from their individual rings or coils, which is done by pulling them by and over a let-off roll adjacent to the rotating drum that rotates at a peripheral speed twice that of the drum.

The threads pass under a second let-off roll having the peripheral speed of the drum, and then through a comb that is as long as the drum, after which they converge and pass through a shorter comb that forms the entrance to the thread gathering section of the machine. The threads pass over a pair of toothed beater rolls that both scrape and vibrate the threads, shaking off the dusting powder by scraping and jiggling the threads, which action also reduces friction of the threads with the comb. A mohair covered roller and vacuum cleaner assist in cleaning the threads. The threads pass over a grooved roller to maintain their initial alignment made by the comb, whereupon the evenly distributed threads pass between spaced washers mounted on a bar that divide the threads into spaced groups that are to be the ribbons. The threads next pass under one or more crowding plates having concave thread engaging edges that gently urge the individual threads of each group into contact but this crowding does not apply enough force to re-unite the individual groups (ribbons) of threads.

From the crowding plates the threads enter the cementing section, passing first over a knurled roll that rotates oppositely to thread motion. Here the threads are again vibrated or jiggled which, due to the tension, causes threads that are twisted to jump back into their normal, edge to edge relation. Next, the threads pass over a cement applying roll and between a pair of pins that wipe off excess cement and help maintain the threads in their flat, or squared condition. The threads (now ribbons) leave the cement section by passing over a concave roll that gently crowds the threads axially toward the mid-plane, closing any small gaps that might have occurred between individual threads during cementing, the cement being still in liquid form at this stage.

The cemented ribbons now pass between upper and lower electric heaters to give a rapid, short-span initial drying action, whereupon they are festooned back and forth over pull rolls while being subjected to radiant heat. The importance of the two heating units and other features will be explained in the detailed description that follows.

The ribbons are then carried over a series of delivery rolls, each one of which peels off one ribbon and lets it fall into a box below. Ribbon gathering means may be provided to lay or fold the ribbons in their respective boxes.

A more detailed description of a preferred method and apparatus embodying the invention, given so that one skilled in the art may practice the same appears below.

In the drawings:

Fig. 1 is an enlarged view of a 4 ribbon group of threads;

Fig. 2 is a diagrammatic side view of the apparatus;

Fig. 3 is a diagrammatic plan view of the apparatus;

Figure 4B:
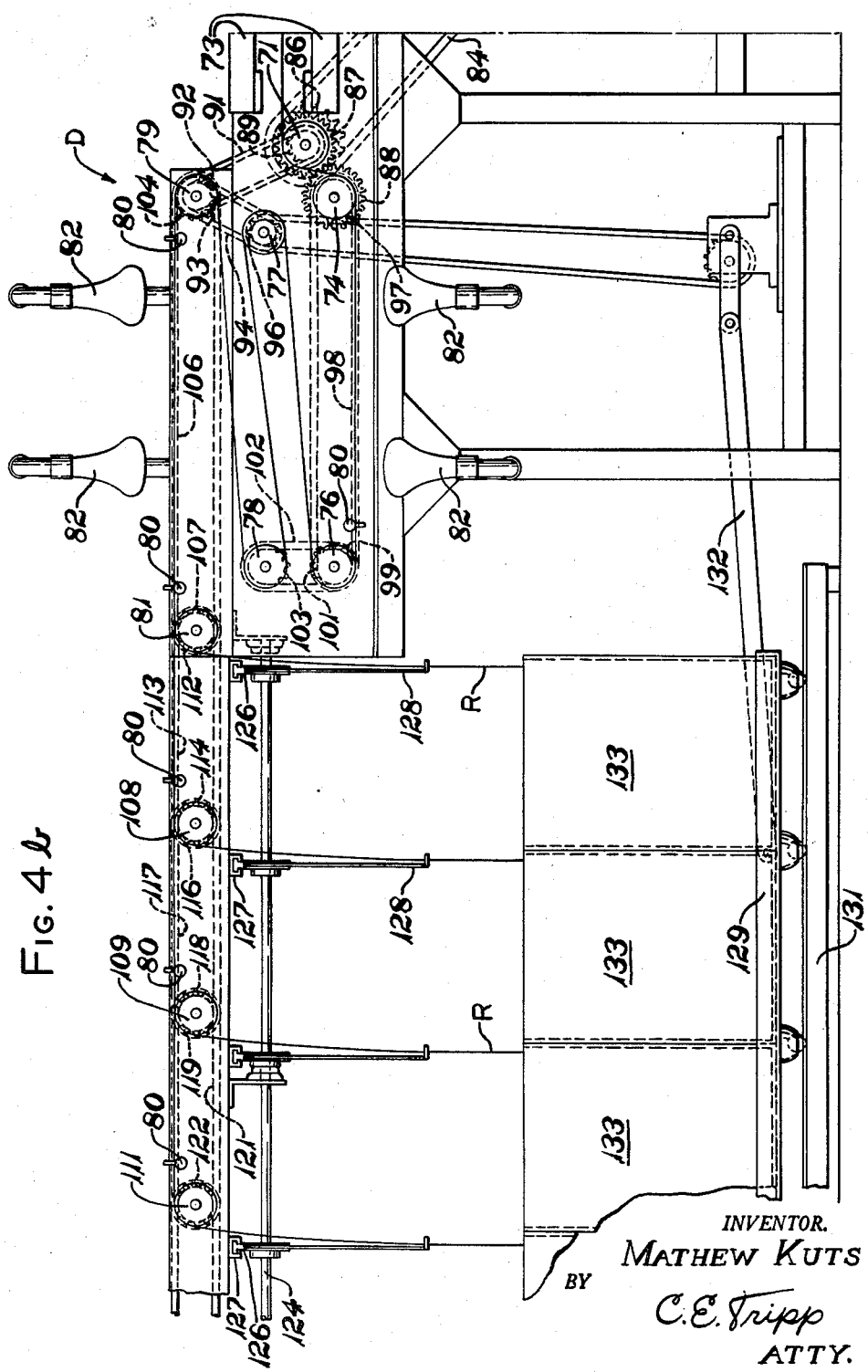

Figs. 4A and 4B combined give a side view of the apparatus, omitting the drum and let-off section, and with the parts drawn approximately to scale;

Figs. 5A and 5B are plan views corresponding to Figs. 4A and 4B;

Fig. 6 is a side view of the gathering and cementing sections. The elements are drawn to scale relatively, but their longitudinal spacing is compressed to save space. The preferred relative spacings appear in Figs. 4A and 4B;

Fig. 7 is a plan view corresponding to Fig. 6;

Fig. 8 shows mounting details of the grooved roller;

Fig. 9 is a fragmentary section of the roller;

Fig. 10 is a front view of a crowding plate;

Fig. 11 is a view of the concave roller; and

Fig. 12 shows a slotted ribbon guide plate that is disposed at the exit of the cementing section.

Referring to Fig. 1, a typical series of ribbons R are shown, wherein 48 threads T are grouped into 4 ribbons R and the threads are temporarily cemented together for handling purposes as described. A detailed description of a method and apparatus for producing these ribbons follows.

*General arrangement*

Figs. 2 and 3 are simplified, diagrammatic views of an apparatus embodying the invention. The apparatus can be arbitrarily divided into 5 sections for purposes of explanation, it being understood that all sections cooperate and interact to produce the thread ribbons, the manufacture of which is an object of this invention. These sections are A, the drum and let-off section wherein the vulcanized rubber threads are unwound from the drum and formed into a wide band. Next comes the thread gathering section B wherein the threads are arranged into a narrower band and the band is divided into groups of threads which will eventually be cemented together and will be ribbons. Next is the cementing section C wherein the groups of threads receive an application of cement to join them edge to edge; there following a drying section D which includes a resistance drying assembly that heats both the top and bottom of the ribbons over a short span and a radiant heat drying unit that slowly dries a longer length of the ribbons. Finally, there is a delivery section E wherein the ribbons are successively peeled off and laid in cartons for shipment.

In the following detailed description of the preferred embodiment of my invention I will give dimensions and other data of a machine operated to produce 4 ribbons of 12 threads starting with 48 individual threads.

It is to be understood that the relative dimensions specifically described in this example will vary in accordance with various requirements such as thread size, tensile strength and the like, but it is believed that those skilled in the art will be able to practice the art under varying conditions based on the example to be given.

*The drum and let-off section*

Referring to Fig. 2, the ribbons have been cured on a large drum which is 4 feet in diameter and 7 feet long, and is driven at a peripheral speed of 30 feet per minute. The drum is supported for rotation on a stand 11 and is driven at constant speed by a drive unit 12, by means of a sprocket 13 that engages a roller chain 14 that is wrapped around the drum. The first let-off roll 16 is adjacent the drum and rotates in the direction of thread motion at twice the drum speed. Should any individual thread adhere to the drum and tend to be carried around with it, the resulting increased frictional contact with the roller 16 coupled with its relatively high surface speed soon breaks that thread loose from its coil so that the thread enters the band and is not broken. Roll 16 is driven from drive unit 12 by means of chain 17 and sprocket 18. This and all the details of the driving mechanism to be described from time to time form specifically no part of the invention. However, it will appear from time to time that the ultimate relative speeds of the driven units may be important to the practice of the invention.

A second let-off roll 19 receives the threads and is driven by chain 21 and sprocket 22 from a sprocket in the drive unit 12. This roll is driven at the same peripheral speed as that imparted to the drum 10. The threads are uniformly spaced across the width of the drum by a long comb 23 having small projecting pins 24, so that when the threads leave comb 23 they are uniformly spaced across the length of the drum.

*The gathering section*

Reference is made to Figs. 4A and 4B and 5A and 5B. A table 30 supports spaced side plates 31 and 32 which mount the various parts of the machine. At the entrance to the apparatus on the table is a narrow comb 33 to which the band of threads converge from the wide comb 23. This comb is capable of handling at least 48 threads and has pins .045" in diameter and .050" apart edge to edge. The comb is approximately 5" long. A bent thread support 34 projects from the comb to support the threads as they enter the comb. The threads next pass under a pair of beaters 36 and 37. These vibrate the threads and scrape them to clear them of dusting powder and to assist in relieving localized tension and twists in the threads.

Certain specific details of construction of the beaters and other parts to be described relative to the specific machine being explained will be given later, but at this point the gearing and means for driving the various moving parts will be described.

The beaters are driven by motor 38 and a pair of variable speed pulleys 39 connected by belt 41, which pulleys can be individually adjusted to make the speed of rotation of the beaters equal. The portions of the beaters that engage the threads move in the same direction as the threads but their peripheral speed is higher; namely, 9,000 feet per minute. The threads then pass under a tension bar 42 and then over a grooved roller 43 which is freely turning and which assists in maintaining thread alignment. The threads then pass over a separator assembly 44 which divides them into groups of threads, which are to be cemented together into ribbons. The threads then pass under and are pressed down slightly by a pair of crowding plates 46 and 47, which have concave edges and tend to crowd the individual threads together into edge to edge contact. The threads next engage a knurled roll 48 rotating in the direction opposite to thread motion. This roll vibrates the threads and relieves localized tensions and causes threads that are twisted to lay flat in edge to edge contact. The threads then pass over a cement applying roll 49 and between a pair of rods 51 which wipe off excess cement. They then ride over a concave or hour glass roll 52, which exerts a slight crowding action on the threads, while the cement is still in liquid form, bringing together any threads within a ribbon that have been separated during the cementing operation. The scraper 53 completes the removal of any excess cement, wherein the ribbons pass through notches in a ribbon guide plate 54.

The cement roller 49 dips into liquid cement supplied to the cement pan 56. A suitable cement is found to be formed of a base of vinyl chloride plasticized by an acrylonitrile rubber and tackified by a phenolic resin. With latex rubber this provides adequate temporary adhesion and yet separates without tearing the rubber. A suitable solvent is methyl ethyl ketone and the cement is very thin for rapid drying.

The drive means for the parts just described include a motor 57, a speed reducer 58 and a drive sprocket 59, over which chain 61 passes to drive a sprocket 62 keyed to the shaft of the cement roller. The gear 63 on the same shaft drives a smaller gear 64 to rotate the knurled roller 48 in the opposite direction and to a peripheral speed higher than that of the thread advance, namely 61 ft./min.

Another sprocket 66 on the cement roll shaft drives a chain 67 and a sprocket 68 on the shaft to rotate the concave roller 52 in the direction of thread motion. The cement roll is driven at a peripheral speed of 45 ft./min. and the concave roll 52 is driven at a peripheral speed of 45 ft./min.

The drying section

The threads are dried in two steps. Since the threads in the ribbons themselves are quite delicate, long spans are not available during the drying operation because the tension necessary to eliminate objectionable sagging with long spans would be too great. Thus, the ribbons are pulled through the first part of the drying section by means of 2.932" diameter pull rolls 71 and 74 rotating at 30 ft./min. speed, there being a span 72 of ribbons presented to both upper and lower resistance heaters 73, so that there is an initial rapid drying of the cement on both surfaces of the ribbons.

The ribbons are then looped back and forth in a radiant heater drying section, passing over pull rolls 76—79, each roll being driven at the same rotational speed as that of rolls 71, 74 but rolls 76—79 are each .002" larger in diameter than the proceeding roll, to maintain uniform tension on the ribbons and to prevent them from sagging during drying.

A number of bars 80 having ribbon guide pins are disposed in the drying section. The ribbons leave the drying section by passing over a first peel-off roll 81 and infrared lamps 82 supply the heat for the drying operation. The rolls just referred to are driven as follows.

A sprocket 83 on the speed reducer 58 drives a chain 84 and a sprocket 86 on the shaft of roll 71. A gear 87 on the same shaft drives a gear 88 on the shaft of roll 74. A sprocket 89 on the shaft of roll 71 drives a chain 91 and a sprocket 92 on the shaft of roll 79. A sprocket 93 on the shaft of roll 79 drives a chain 94 and a sprocket 96 on the shaft of roll 77. A sprocket 97 on the shaft of roll 74 drives a chain 98 and a sprocket 99 on the shaft of roll 76. A sprocket 101 on the shaft of roll 76 drives a chain 102 and a sprocket 103 on the shaft of roll 78. A sprocket 104 on the shaft of roll 79 drives a chain 106 and a sprocket 107 on the shaft of roll 81.

Delivery system

One ribbon is dropped at the initial peel-off roll 81 after which the ribbons pass over additional peel-off rolls 108, 109 and 111, the number of peel-off rolls depending on the number of ribbons being manufactured from a given band of threads. These rolls are driven by a sprocket 112 on the shaft of the first peel-off roll 81 which drives a chain 113 and a sprocket 114 on the shaft of roll 108. Another sprocket 116 on the shaft of roll 108 drives a chain 117 and a sprocket 118 on the shaft of roll 109. Similarly, a sprocket 119 on the shaft of roll 109 drives a chain 121 and a sprocket 122 on the shaft of roll 111. This system is repeated for as many peel-off rolls as are provided.

Although it forms no part of my invention, I prefer to lay the assembled ribbons into cartons for shipment. To do this, a rock shaft 124 extends lengthwise of the delivery portion of the machine and carries the number of gears that mesh with racks 126 mounted in guides 127 from which depend wire eyelet members 128 through which the ribbons pass. The shaft 124 is oscillated so that the racks 126 slide back and forth and the ribbons are laid and distributed in the cartons 133 from side to side.

In order to distribute the ribbons in the cartons as longitudinal folds the cartons are mounted on a carriage 129 which is supported for reciprocation on a platform 131 and is reciprocated longitudinally of the machine by a connecting rod 132, the details of this mechanism forming no part of the invention. Each ribbon is then peeled off at one of the peel-off rolls 81, 108—111 and laid in loose folds in the cartons 133.

Additional construction details and operation

The major sections of the apparatus, the major components and the means to drive the components have been described. In the interests of clarity, this description of the operation of the device will include certain details of construction of a typical machine which have not been heretofore mentioned. The operation will be explained with reference to the diagrams of Figs. 6 and 7 and to Figs. 8–12 which show various details of construction of elements of the apparatus in the preferred embodiment of the invention.

As the threads leave the reel drum at 30 ft./min., they enter comb 33 where they are arranged by comb pins 141 into a band of uniformly spaced threads. They then pass under the beaters 36 and 37 which deflect them slightly and shake loose any dusting powder that may be freely on the threads, which shaking also relieves localized tension, straightens out crossovers, and assist in untwisting any twisted threads. As mentioned, these beaters run peripherally in the same direction as the threads but they turn at a higher peripheral speed than that of the threads; namely, 9,000 ft./min. They are formed with 20 flutes or teeth 142 $\frac{1}{16}$" deep and the rolls have an outside diameter of 1¼".

The threads next pass under a tension bar 42 which constrains them from hopping out of the grooves in a grooved roll 43. This roller is a freely turning roller so that the tension on the threads is minimized. This construction is seen in Fig. 8. It is supported on a bracket 143 by means of conical shafts 144. The grooves have tapered sidewalls 146 and the preferred form being at an angle of 10° to the radial plane. The base of the grooves has a width W, Fig. 9, of about 0.45" and the grooves are spaced .095" from center to center. After leaving the groove roller the threads are separated into groups by the separator 44.

In the set-up described, the separator shaft 147 will have five separating washers 148 mounted thereon to divide the threads into four groups which will eventually be cemented into ribbons. The threads then pass under and are slightly deflected by a pair of crowding plates 46 and 47. The plates have concave edges 149 having a radius of about 2" to 6", depending on the number of ribbons being made. The crowding plates apply progressively increasing tension on the threads from the midplane to the edge of the plates, thereby gently urging the threads within the ribbons together into edge to edge contact. However, this action is not sufficient to recombine the various groups of threads (which will form ribbons) into a single band.

The threads then pass over a knurled roll 48 which vibrates them, relieves localized tensions and permits twisted threads to untwist and lie side-by-side in surface contact. This roll is 1⅜" in diameter and as mentioned it runs backward at about twice the speed of the threads. The roll is knurled or corrugated to facilitate this action. The threads are then pulled over the cement roll 49 which is 2⅜" in diameter and runs in the same direction as the motion of the threads but faster than such motion to maintain adequate supply of cement. As mentioned, the peripheral speed of the cement roll is about 45 ft./min.

The threads then pass under and over the laying pins 51 which exert a wiping and straightening action upon them and assist in removing excess cement. These pins are ³⁄₁₆" in diameter and are spaced ⅜" from center to center.

The threads then pass over the concave roller 52 which exerts an action similar to that of the crowding plates but since it is rotating with the threads it does not tend to longitudinally restrain them. However, it does tend to bring together any threads in any ribbons which have become separated. This roller has a major diameter "a," Fig. 11, of 1¾" and a minor diameter "b" at the mid-plane of 1⅜" and, as mentioned, it rotates with the threads but at a higher speed, namely, 45 ft./min.

A scraper 53 lightly presses against the threads after they leave the roller to remove any excess cement which may remain on the threads and prevent cement from building up on the pull rolls that follow.

The ribbons then pass through notches in guide plate 54 which, as seen in Fig. 12, has 4 notches 151 separated by spacing projections 152. Different plates may be provided for various set-ups, depending upon the number of ribbons being made up from the band of threads.

The ribbons then pass between resistance heaters 73 and pass over pull rolls 71 and 74 which have a diameter of 2.932" and a peripheral speed of 30 ft./min. The ribbons are then looped back and forth over succeeding pull rods 76—79, each of which is .002" larger than the preceding roll, so that sagging is not permitted in the drying section and yet an excess tension is not applied to the threads. These rolls all rotate at the same speed.

The ribbons then pass over the delivery rolls 81 and 108—111+. The peripheral speeds of the last drying roll 79 and the delivery rolls are the same and the action of gravity on the loops applies the proper tension at the delivery rolls.

Employing this apparatus, I have been able to consistently and uniformly assemble very fine threads, as described earlier in the specification, into ribbons which can be handled using ordinary care without danger of serious separation of the threads within each ribbon and when the ribbons are fed into subsequent machines, the individual threads can be readily separated. The breakage of the threads during assembly into ribbons is reduced to a minimum due to precise and careful handling.

In the broader aspects of the invention, I need not supply the machine with threads from a large drum, as described, individual spools of threads being usable. However, I have found that use of the drum is particularly suitable for fine, delicate threads which cannot stand any localized tension or mishandling. Also, additional separators such as the shaft and washer assembly 44 may be provided where needed, for example, there may be a separator disposed between the crowding plate 47 and the knurled roller 48. Although two crowding plates 46 and 47 are shown, a single crowding plate may be employed where only a single or a few ribbons are grouped to form a band of threads. Also, where two crowding plates are employed, the first may have a larger radius than the second to make the crowding process gradual.

Although this apparatus is particularly adapted for use with square threads such as are formed by slitting sheets of rubber latex, in the broader aspects of the invention, the machine is useful in assembling extruded threads which may be wound into ribbons. Of course with the latter type of operation, the problem of the twist of the threads is not as severe as it is when square threads are being run. However, the threads must still be relieved of localized tension and crossovers and laid edge to edge together to obtain a suitable cemented ribbon.

Having given a detailed description of a preferred embodiment of the invention so that those skilled in the art may practice the same, I claim:

1. A method for continuously assembling a number of cured rubber threads into a ribbon comprising the steps of forming the threads into a band while continuously pulling the threads along under light tension, urging the threads into edge to edge contact in the plane of the band to form a ribbon, mechanically vibrating the threads in a direction normal to the plane of the band to cause twisted threads to untwist and to remove crossovers, applying cement to the ribbon of threads, and drying the cement.

2. A method for continuously assembling a number of cured rubber threads into a ribbon comprising the steps of forming the threads into a band while continuously pulling the threads along under light tension, vibrating and scraping the threads to remove dusting powder and relieve inequalities in thread tension and disposition, urging the threads into edge to edge contact in the plane of the band to form a ribbon, further mechanically vibrating the threads in a direction normal to the plane of the band to further remove inequalities in thread tension and to cause twisted threads to untwist, applying cement to the ribbon of threads, and drying the cement.

3. A method for continuously assembling a number of cured rubber threads into a ribbon comprising the steps of rotating a drum upon which is wound a number of threads in individual coils, frictionally pulling the threads from the drum to form a wide band of relatively widely spaced threads, mechanically adjusting said threads into a uniform spacing across said band, converging said threads into a narrow band while continuously pulling the threads along under light tension, urging the threads into edge to edge contact in the plane of the band to form a ribbon, mechanically vibrating the threads in a direction normal to the plane of the band to cause twisted threads to untwist, applying cement to the ribbon of threads, and drying the cement.

4. A method for continuously assembling a number of cured rubber threads into a ribbon comprising the steps of forming the threads into a band while continuously pulling the threads along under light tension, mechanically vibrating the threads in a direction normal to the plane of the band, while urging the threads into edge to edge contact in the plane of the band to cause twisted threads to untwist, applying cement to the ribbon of threads, and drying the cement.

5. A method for continuously assembling a number of cured rectangular rubber threads into a ribbon comprising the steps of forming the threads into a band while continuously pulling the threads along under light tension, urging the threads into edge to edge contact in the plane of the band to form a ribbon, mechanically vibrating the threads in a direction normal to the plane of the band to cause twisted threads to untwist, applying cement to the ribbon of threads, pulling said ribbon under light tension over a span that is directly heated from both sides, and passing said ribbon back and forth between radiant heaters while slightly but progressively increasing the tension on said ribbon.

6. Apparatus for forming cured rubber threads into a ribbon comprising a rotatable drum on which the cured threads are wrapped in individual coils, means to rotate said drum at a given peripheral speed, a let-off roll for said threads rotating in the same direction as but at a peripheral speed higher than that of said drum, a comb for arranging said threads into a band of uniformly spaced threads, a beater roll engaging said threads and rotating with but faster than the motion of said threads, means for grouping said threads into ribbon, means for assembling adjacent threads of each ribbon together edge to edge, a roughened thread jiggling roll rotating oppositely to thread motion against which said threads are lightly pressed, a cement roll over which said threads pass, means for lightly crowding threads together that might have separated during cementing, one or more pairs of pull rolls for said threads with said pairs of rolls being disposed one above the other, said pull rolls having a progressively increasing peripheral speed moving in the direction of travel of said threads, and a cement dryer at said pull rolls.

7. Apparatus for forming cured rubber threads into a ribbon comprising a rotatable drum on which the cured threads are wrapped in individual coils, means to rotate said drum at a given peripheral speed, a let-off roll for said threads rotating in the same direction as but at a peripheral speed higher than that of said drum, a comb for arranging said threads into a band of uniformly spaced threads, a beater roll engaging said threads and rotating with but faster than the motion of said threads, means for grouping said threads into ribbon, means for assembling adjacent threads of each ribbon together edge to edge, a roughened thread jiggling roll rotating oppositely to thread motion against which said threads are lightly pressed, a cement roll over which said threads pass, means for lightly crowding threads together that might have separated during cementing, one or more pairs of pull rolls for said threads with said pairs of rolls being disposed one above the other, said pull rolls having a progressively increasing diameter when taken in the direction of travel of said threads, and a cement dryer at said pull rolls.

8. Apparatus for forming cured rubber threads into a ribbon comprising means for forming the cured threads into a band of uniformly spaced threads, means for gently crowding adjacent cured threads together edge to edge, means to vibrate said threads transverse to the plane of said band to assist in bringing them together, a cement roll over which said threads pass, one or more pairs of pull rolls for said threads with said pairs of rolls being disposed one above the other, said pull rolls having a progressively increasing peripheral speed moving in the direction of travel of said threads, and a cement dryer at said pull rolls.

References Cited in the file of this patent

UNITED STATES PATENTS

| 2,082,744 | Shaw | June 1, 1937 |
| 2,426,553 | Hagler | Aug. 26, 1947 |
| 2,652,203 | Cone | Sept. 15, 1953 |
| 2,678,676 | Slovin | May 18, 1954 |

FOREIGN PATENTS

| 651,665 | Great Britain | Apr. 4, 1951 |